US011987956B2

(12) United States Patent
Oasa

(10) Patent No.: US 11,987,956 B2
(45) Date of Patent: May 21, 2024

(54) WORK VEHICLE, CONTROL DEVICE FOR WORK VEHICLE, AND CONTROL METHOD FOR WORK VEHICLE

(71) Applicant: KOMATSU LTD., Tokyo (JP)

(72) Inventor: Takahisa Oasa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 420 days.

(21) Appl. No.: 17/422,607

(22) PCT Filed: Apr. 2, 2020

(86) PCT No.: PCT/JP2020/015154
§ 371 (c)(1),
(2) Date: Jul. 13, 2021

(87) PCT Pub. No.: WO2020/204128
PCT Pub. Date: Oct. 8, 2020

(65) Prior Publication Data
US 2022/0090360 A1 Mar. 24, 2022

(30) Foreign Application Priority Data
Apr. 4, 2019 (JP) ................................ 2019-072102

(51) Int. Cl.
*E02F 9/20* (2006.01)
*E02F 9/22* (2006.01)
(Continued)

(52) U.S. Cl.
CPC .......... *E02F 9/2253* (2013.01); *E02F 9/2079* (2013.01); *E02F 9/2235* (2013.01);
(Continued)

(58) Field of Classification Search
CPC ........ F02D 29/00; F02D 29/02; F02D 11/105; F02D 29/04; E02F 9/2246; E02F 9/2296;
(Continued)

(56) References Cited

U.S. PATENT DOCUMENTS 9,199,644 B2 * 12/2015 Shimizu .................. F16H 61/47
10,392,781 B2 * 8/2019 Uno ........................ E02F 3/431
(Continued)

FOREIGN PATENT DOCUMENTS

CN 101631972 A * 1/2010 ...... B60W 30/18063
CN 101687508 A * 3/2010 ............ B60K 6/365
(Continued)

OTHER PUBLICATIONS

Garceau, Timothy J. "A Multi-Scalar Model to Identify the Causes of Decreased Vehicle Miles Traveled (VMT) in the United States." (Year: 2015).*
(Continued)

*Primary Examiner* — Cuong H Nguyen
(74) *Attorney, Agent, or Firm* — Global IP Counselors, LLP

(57) ABSTRACT

A work vehicle controls an engine output based on an accelerator operation amount and a work equipment operation amount. A control device for the work vehicle includes an acceleration correction unit, a target vehicle speed determination unit, and a deceleration correction unit. The acceleration correction unit obtains a corrected accelerator operation amount by correcting the accelerator operation amount based on an inching operation amount. The target vehicle speed determination unit determines a target vehicle speed based on the corrected accelerator operation amount and a signal based on an operation of a shift operation member. The deceleration correction unit corrects the target vehicle speed based on the inching operation amount.

4 Claims, 10 Drawing Sheets

(51) Int. Cl.
*F02D 11/10* (2006.01)
*F02D 29/04* (2006.01)

(52) U.S. Cl.
CPC .......... *E02F 9/2246* (2013.01); *E02F 9/2296* (2013.01); *F02D 11/105* (2013.01); *F02D 29/04* (2013.01)

(58) Field of Classification Search
CPC ..... E02F 9/2235; E02F 9/2253; E02F 9/2079; E02F 9/20
USPC ...................................................... 701/51, 67
See application file for complete search history.

(56) References Cited

U.S. PATENT DOCUMENTS

| | | | | |
|---|---|---|---|---|
| 2009/0306835 | A1 | 12/2009 | Ellermann et al. | |
| 2010/0042301 | A1 | 2/2010 | Shimizu et al. | |
| 2010/0152981 | A1* | 6/2010 | Nishi | B60W 10/11 701/50 |
| 2015/0090507 | A1* | 4/2015 | Okada | B66F 9/07568 701/50 |
| 2015/0315767 | A1 | 11/2015 | Miyamoto et al. | |
| 2016/0289055 | A1 | 10/2016 | Kaneko et al. | |
| 2021/0131070 | A1* | 5/2021 | Oasa | E02F 9/2029 |

FOREIGN PATENT DOCUMENTS

| | | | | | |
|---|---|---|---|---|---|
| CN | 101631972 | B | * | 3/2014 | B60W 30/18063 |
| CN | 204386751 | U | | 6/2015 | |
| CN | 109477502 | B | * | 6/2021 | E02F 3/435 |
| JP | 3-243427 | A | | 10/1991 | |
| JP | 2712535 | B2 | | 2/1998 | |
| JP | 10-243504 | A | | 9/1998 | |
| JP | 2003-269205 | A | | 9/2003 | |
| JP | 2006-233843 | A | | 9/2006 | |
| JP | 2008-223815 | A | | 9/2006 | |
| JP | 5264091 | B2 | | 8/2013 | |
| JP | 2014-190434 | A | | 10/2014 | |
| JP | 6619799 | B2 | * | 12/2019 | E02F 3/283 |
| WO | WO-2008111655 | A1 | * | 9/2008 | B60W 30/18063 |
| WO | 2014/208614 | A1 | | 12/2014 | |
| WO | 2019/003761 | A1 | | 1/2019 | |

OTHER PUBLICATIONS

Hvolka, D. J., and R. J. Olsen. An abstract of "The EIMCO 922 Load-Haul-Dump-A Basic Design Approach for Fuel Economy and Performance. No. 841165". SAE Technical Paper, (Year:1984).*

Suzuki, Satoshi, and Fumio Harashima. "Skill evaluation from observation of discrete hand movements during console operation." Journal of Robotics 2010. (Year: 2010).*

The International Search Report for the corresponding international application No. PCT/JP2020/015154, dated Jun. 16, 2020.

* cited by examiner

WORK VEHICLE, CONTROL DEVICE FOR WORK VEHICLE, AND CONTROL METHOD FOR WORK VEHICLE

CROSS REFERENCE TO RELATED APPLICATION(S)

This application is a U.S. National stage application of International Application No. PCT/JP2020/015154, filed on Apr. 2, 2020. This U.S. National stage application claims priority under 35 U.S.C. § 119(a) to Japanese Patent Application No. 2019-072102, filed in Japan on Apr. 4, 2019, the entire contents of which are hereby incorporated herein by reference.

BACKGROUND

Field of the Invention

The present invention relates to a work vehicle, a control device for a work vehicle, and a control method for a work vehicle.

Background Information

A work vehicle such as a wheel loader equipped with a continuously variable transmission is known. Examples of the continuously variable transmission include a hydraulic static transmission (HST) and a hydraulic mechanical transmission (HMT). PCT International Publication WO 2014/208614 discloses a technique for determining a target rotation speed of an engine of a work vehicle equipped with the continuously variable transmission, based on an operation amount of an accelerator pedal and an operation amount of a work equipment operation lever.

SUMMARY

In a work vehicle, work may be carried out by work equipment and the work vehicle may travel at the same time in some cases. In this case, in the work vehicle disclosed in PCT International Publication WO 2014/208614, the work can be carried out by the work equipment while the work vehicle travels by operating a work equipment operation lever and an accelerator pedal. In this case, an operator operates the work equipment operation lever with an operation amount corresponding to a desired operation speed of the work equipment, and operates the accelerator pedal with an operation amount corresponding to a desired traveling speed.

On the other hand, in a work vehicle equipped with a torque converter type transmission instead of a continuously variable transmission, an engine speed is determined by operating the accelerator pedal. Therefore, when the operator wants to accelerate the work equipment while suppressing acceleration of the work vehicle, the operator suppresses the acceleration of the work vehicle by pressing an inching pedal while pressing the accelerator pedal.

Therefore, there is a possibility that an operator accustomed to a torque converter type transmission may have a sense of unease in operating a work vehicle in which work equipment is accelerated by the operation amount of a work equipment operation lever.

In a work vehicle that controls engine drive, based on an operation amount of a work equipment operation lever and an accelerator pedal, an object of the present invention is to provide a work vehicle, a control device for a work vehicle, and a control method for a work vehicle, which realize suppressed acceleration by operating an inching pedal.

According to one aspect of the present invention, a control device for a work vehicle is provided which controls an engine output, based on an accelerator operation amount and a work equipment operation amount. The control device includes an acceleration correction unit that obtains a corrected accelerator operation amount by correcting the accelerator operation amount, based on an inching operation amount, and a target vehicle speed determination unit that determines a target vehicle speed, based on the corrected accelerator operation amount and a signal based on an operation of a shift operation member.

According to the above-described aspect, in the work vehicle that controls engine drive, based on an operation amount of a work equipment operation lever and an accelerator pedal, the control device for the work vehicle can realize suppressed acceleration by operating an inching pedal.

DETAILED DESCRIPTION OF EMBODIMENT(S)

First Embodiment

Hereinafter, an embodiment will be described in detail with reference to the drawings.

Figure 1:
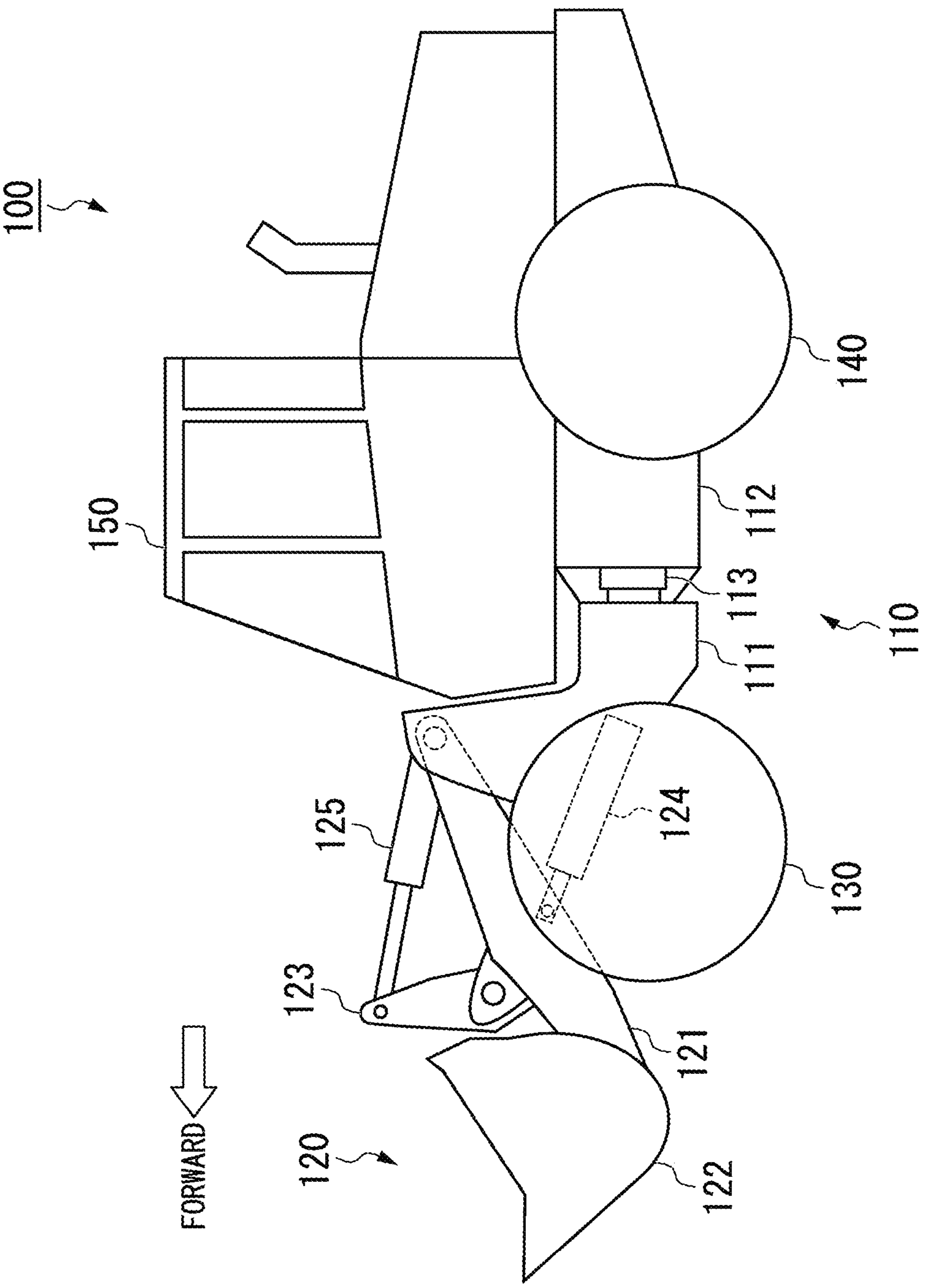
FIG. 1 is a side view of a work vehicle according to a first embodiment.

FIG. 1 is a side view of a work vehicle according to a first embodiment.

A work vehicle 100 according to the first embodiment is a wheel loader. The work vehicle 100 includes a vehicle body 110, work equipment 120, a front wheel part 130, a rear wheel part 140, and a cab 150.

The vehicle body 110 includes a front vehicle body 111, a rear vehicle body 112, and a steering cylinder 113. The front vehicle body 111 and the rear vehicle body 112 are attached to be pivotable around a steering shaft extending in an upward-downward direction of the vehicle body 110. The front wheel part 130 is provided in a lower part of the front vehicle body 111, and the rear wheel part 140 is provided in a lower part of the rear vehicle body 112.

The steering cylinder 113 is a hydraulic cylinder. A base end portion of the steering cylinder 113 is attached to the rear vehicle body 112, and a tip portion is attached to the front vehicle body 111. The steering cylinder 113 is expanded and contracted by hydraulic oil, thereby defining an angle formed between the front vehicle body 111 and the rear vehicle body 112. That is, a steering angle of the front wheel part 130 is defined by expansion and contraction of the steering cylinder 113.

The work equipment 120 is used for excavating and transporting a work object such as earth. The work equipment 120 is provided in a front part of the vehicle body 110. The work equipment 120 includes a boom 121, a bucket 122, a bell crank 123, a lift cylinder 124, and a bucket cylinder 125.

A base end portion of the boom 121 is attached to a front part of the front vehicle body 111 via a pin.

The bucket 122 includes a blade for excavating the work object and a container for transporting the excavated work object. A base end portion of the bucket 122 is attached to a tip portion of the boom 121 via a pin.

The bell crank 123 transmits power of the bucket cylinder 125 to the bucket 122. A first end of the bell crank 123 is attached to a bottom portion of the bucket 122 via a link mechanism. A second end of the bell crank 123 is attached to a tip portion of the bucket cylinder 125 via a pin.

The lift cylinder 124 is a hydraulic cylinder. A base end portion of the lift cylinder 124 is attached to a front part of the front vehicle body 111. A tip portion of the lift cylinder 124 is attached to the boom 121. As the lift cylinder 124 is expanded and contracted by the hydraulic oil, the boom 121 is driven in an upward direction or a downward direction.

The bucket cylinder 125 is a hydraulic cylinder. A base end portion of the bucket cylinder 125 is attached to a front part of the front vehicle body 111. A tip portion of the bucket cylinder 125 is attached to the bucket 122 via the bell crank 123. As the bucket cylinder 125 is expanded and contracted by the hydraulic oil, the bucket 122 is driven in a tilt direction or a dump direction.

The cab 150 is a space for an operator who rides in the space to operate the work vehicle 100. The cab 150 is provided in an upper part of the rear vehicle body 112.

Figure 2:
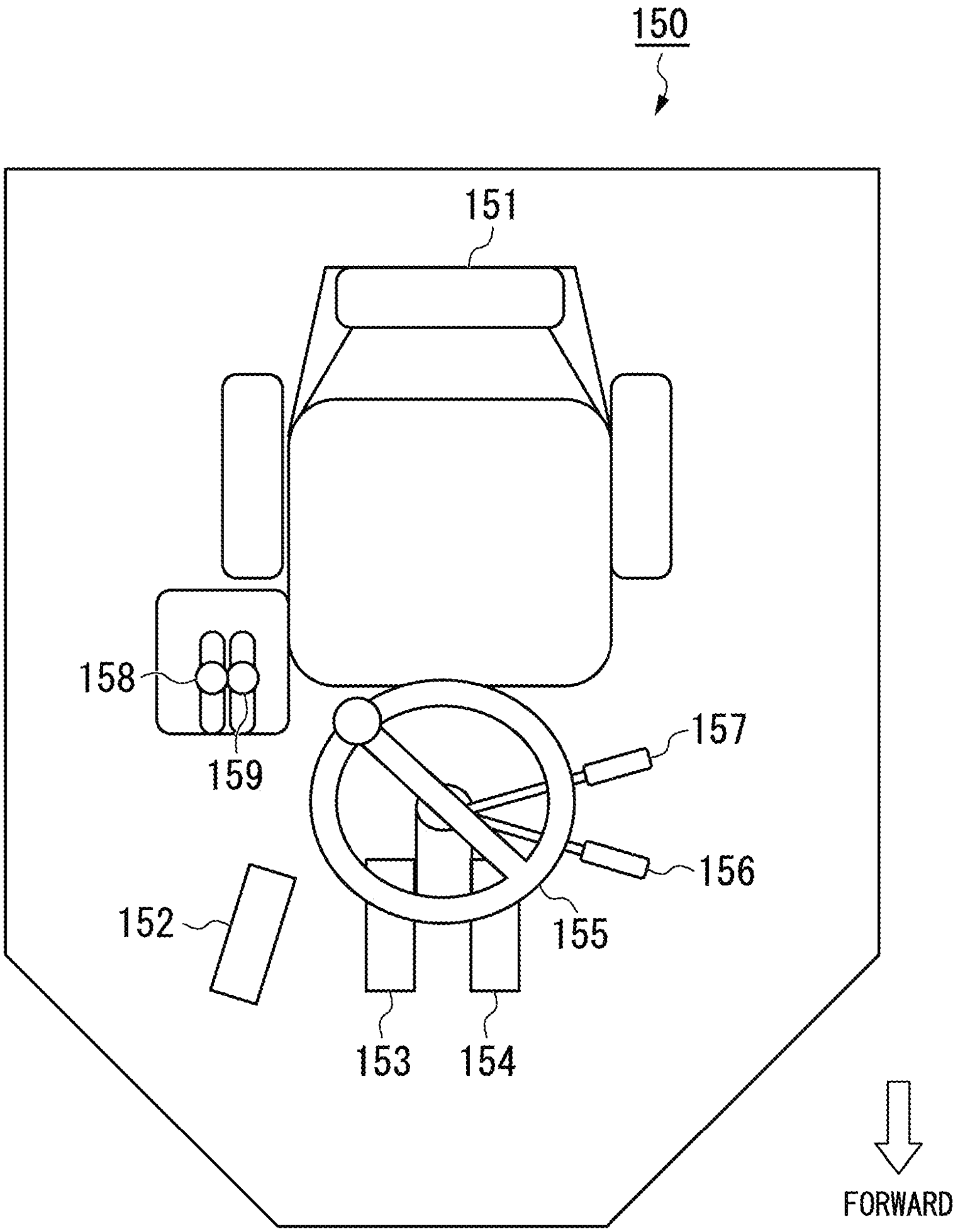
FIG. 2 is a view showing an internal configuration of a cab according to the first embodiment.

FIG. 2 is a view showing an internal configuration of the cab according to the first embodiment. The cab 150 is internally provided with a seat 151, an accelerator pedal 152, a brake pedal 153, an inching pedal 154, a steering wheel 155, a front/rear selection switch 156, a shift switch 157, a boom lever 158, and a bucket lever 159. In the first embodiment, the brake pedal 153 and the inching pedal 154 are provided separately, but the present invention is not limited thereto. For example, in another embodiment, the brake pedal 153 and the inching pedal 154 may be a single pedal which acts as the inching pedal 154 in a region having a shallow pressing operation amount and acts as the brake pedal 153 in a region having a deep pressing operation amount.

The accelerator pedal 152 is operated to set a driving force (traction force) for traveling which is generated by the work vehicle 100. As an operation amount of the accelerator pedal 152 increases, a target driving force (target traction force) is set to be stronger. The operation amount of the accelerator pedal 152 has a value of 0% or greater and 100% or smaller. The accelerator pedal 152 is an example of an accelerator operation member.

The brake pedal 153 is operated to set a braking force for traveling which is generated by the work vehicle 100. As an operation amount of the brake pedal 153 increases, the braking force is set to be stronger. The operation amount has a value of 0% or greater and 100% or smaller.

The inching pedal 154 is operated to set a reduction degree of the driving force for traveling. The operation amount has a value of 0% or greater and 100% or smaller. The work vehicle 100 according to the first embodiment does not include a clutch in the transmission 230. The inching pedal 154 is an example of an inching operation member.

The steering wheel 155 is operated to set a steering angle of the work vehicle 100.

The front/rear selection switch 156 is operated to set a traveling direction of the work vehicle 100. The traveling direction of the work vehicle is either forward (F), rearward (R), or neutral (N).

The shift switch 157 is operated to set a speed range of a power transmission device. For example, the shift switch 157 is operated to select one speed range from a first speed, a second speed, a third speed, and a fourth speed. A signal indicating the speed range set by the shift switch 157 is generated. The shift switch 157 is an example of a shift operation member.

The boom lever 158 is operated to set a speed of a raising operation or a lowering operation of the boom 121. The boom lever 158 receives the lowering operation when tilted forward, and receives the raising operation when tilted rearward.

The bucket lever 159 is operated to set a speed of a dump operation or a tilt operation of the bucket 122. The bucket lever 159 receives the dump operation when tilted forward, and receives the tilt operation when tilted rearward.

The boom lever 158 and the bucket lever 159 are examples of work equipment operation members.

((Power System))

Figure 3:
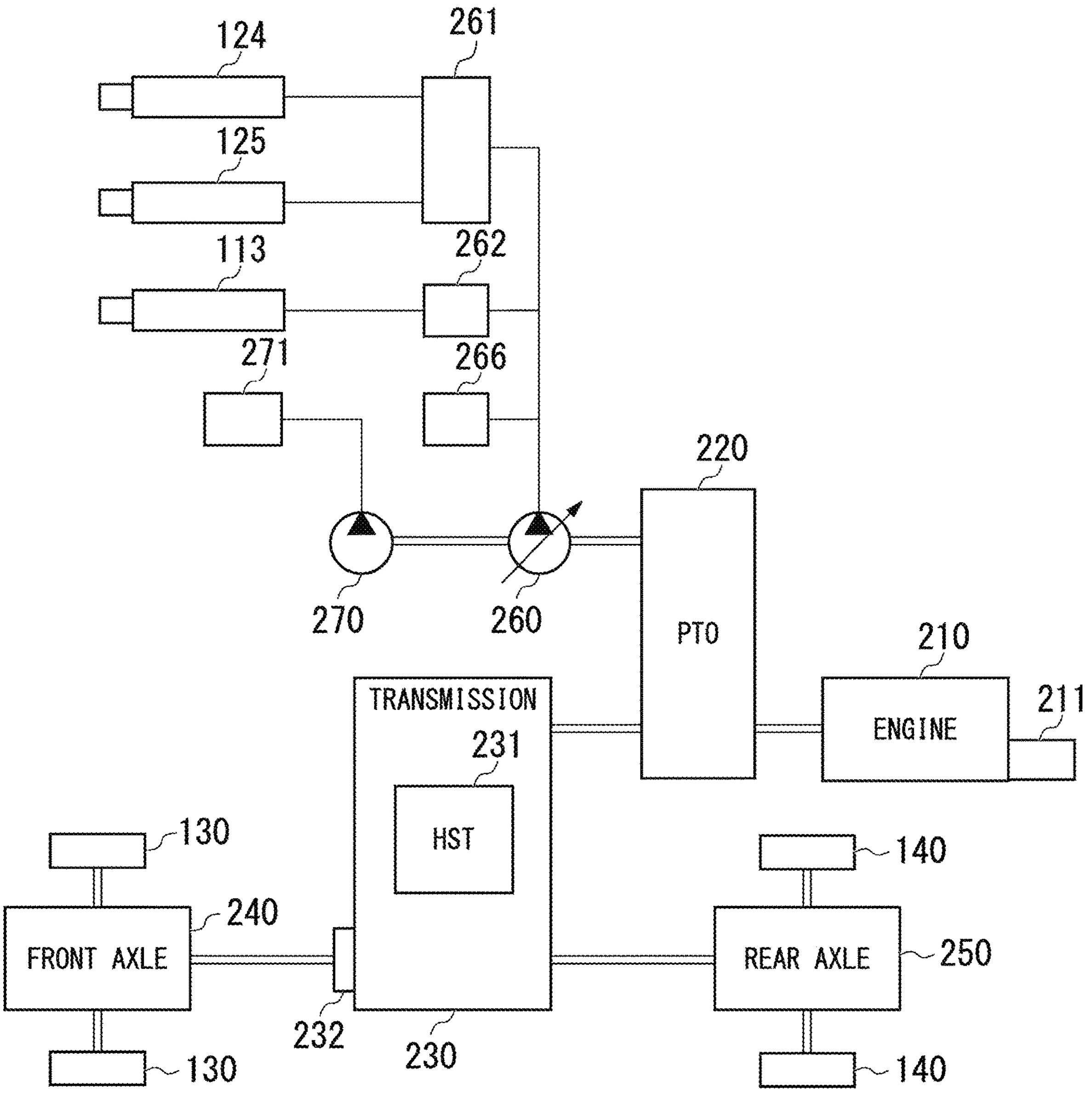
FIG. 3 is a schematic view showing a power system of the work vehicle according to the first embodiment.

FIG. 3 is a schematic view showing a power system of the work vehicle according to the first embodiment.

The work vehicle 100 includes an engine 210, a power take-off 220 (PTO: power take-off device), a transmission 230, a front axle 240, a rear axle 250, a variable capacity pump 260, and a brake pump 270.

For example, the engine 210 is a diesel engine. The engine 210 is provided with a fuel injection device 211. The fuel injection device 211 controls a driving force of the engine 210 by adjusting the amount of a fuel injected into a cylinder of the engine 210.

The PTO 220 transmits a portion of the driving force of the engine 210 to the variable capacity pump 260 and the brake pump 270. That is, the PTO 220 distributes the driving force of the engine 210 to the transmission 230, the variable capacity pump 260, and the brake pump 270.

The transmission 230 is a continuously variable transmission including a hydrostatic continuously variable transmission (HST) 231. The transmission 230 may perform shift control by using only the HST 231, or may be a hydraulic mechanical continuously variable transmission (HMT) that performs shift control by using a combination of the HST 231 and a planetary gear mechanism. The transmission 230 shifts the driving force input to an input shaft, and outputs the driving force from an output shaft. The input shaft of the transmission 230 is connected to the PTO 220, and the output shaft is connected to the front axle 240 and the rear axle 250. That is, the transmission 230 transmits the driving force of the engine 210 which is distributed by the PTO 220 to the front axle 240 and the rear axle 250. A vehicle speed meter 232 is provided in the output shaft of the transmission 230. The vehicle speed meter 232 measures a vehicle speed of the work vehicle 100 by measuring a rotation speed of the output shaft.

The front axle 240 transmits the driving force output by the transmission 230 to the front wheel part 130. In this manner, the front wheel part 130 is rotated.

The rear axle 250 transmits the driving force output by the transmission 230 to the rear wheel part 140. In this manner, the rear wheel part 140 is rotated.

The variable capacity pump 260 is driven by a driving force transmitted from the engine 210. For example, discharge capacity of the variable capacity pump 260 is changed by controlling a tilt angle of a swash plate provided inside the variable capacity pump 260. The hydraulic oil discharged from the variable capacity pump 260 is supplied to the lift cylinder 124 and the bucket cylinder 125 via a control valve 261, and is supplied to the steering cylinder 113 via a steering valve 262. In addition, the hydraulic oil discharged from the variable capacity pump 260 is discharged via a relief valve 266. The variable capacity pump 260 is an example of a work equipment pump.

The control valve 261 controls a flow rate of the hydraulic oil discharged from the variable capacity pump 260, and distributes the hydraulic oil to the lift cylinder 124 and the bucket cylinder 125. The steering valve 262 controls the flow rate of the hydraulic oil supplied to the steering cylinder 113. The relief valve 266 releases a pressure of the hydraulic oil when the pressure exceeds a predetermined relief pressure, and discharges the hydraulic oil.

In another embodiment, the variable capacity pump 260 may be configured by a plurality of pumps, or may include other supply destinations such as hydraulically driven fans (not shown), instead of or in addition to the variable capacity pump 260.

The brake pump 270 is a fixed capacity pump driven by the driving force transmitted from the engine 210. The hydraulic oil discharged from the brake pump 270 is supplied to the brake valve 271. The brake valve 271 controls the pressure of the hydraulic oil supplied to a brake cylinder (not shown) built in each axle. When the hydraulic oil is supplied to the brake cylinder, a brake disc rotating together with the rotary shafts of the front wheel part 130 and the rear wheel part 140 is pressed against a non-rotating plate, and a braking force is generated.

((Control Device))

The work vehicle 100 includes a control device 300 for controlling the work vehicle 100.

The control device 300 outputs a control signal to the fuel injection device 211, the transmission 230, the variable capacity pump 260, and the control valve 261, in response to an operation amount of each operation device (accelerator pedal 152, inching pedal 154, front/rear selection switch 156, shift switch 157, boom lever 158, and bucket lever 159) inside the cab 150.

Figure 4:
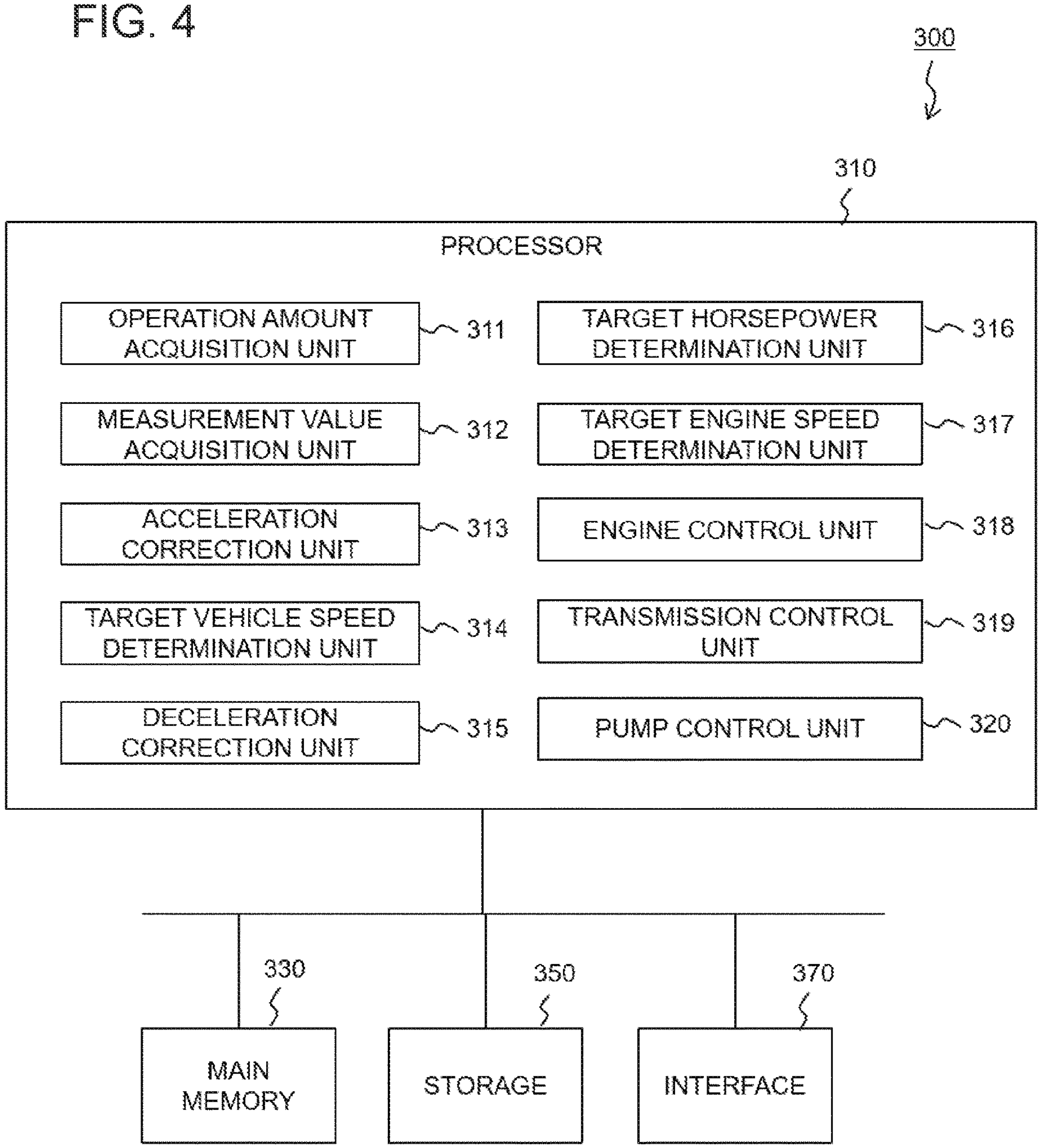
FIG. 4 is a schematic block diagram showing a configuration of a control device for the work vehicle according to the first embodiment.

FIG. 4 is a schematic block diagram showing a configuration of the control device for the work vehicle according to the first embodiment. The control device 300 is a computer including a processor 310, a main memory 330, a storage 350, and an interface 370.

The storage 350 is a non-transitory tangible storage medium. Examples of the storage 350 include a hard disk drive (HDD), a solid-state drive (SSD), a magnetic disc, a magneto-optical disc, a compact disc read-only memory (CD-ROM), and a digital versatile disc read-only memory (DVD-ROM), and a semiconductor memory. The storage 350 may be an internal medium directly connected to a bus of the control device 300, or may be an external medium connected to the control device 300 via the interface 370 or a communication line. The storage 350 stores a program for controlling the work vehicle 100.

The program may partially realize functions of the control device 300. For example, the program may fulfill a function in combination with another program previously stored in the storage or in combination with another program installed in another device. In another embodiment, the computer may include a custom large-scale integrated circuit (LSI) such as a programmable logic device (PLD) in addition to the above-described configuration or instead of the above-described configuration. Examples of the PLD include a programmable array logic (PAL), a generic array logic (GAL), a complex programmable logic device (CPLD), and a field-programmable gate array (FPGA). In this case, functions realized by the processor may be partially or entirely realized by the integrated circuit.

In a case where the program is distributed to the control device 300 via a communication line, the control device 300 receiving the distribution may deploy the program in the main memory 330, and may execute the above-described process.

In addition, the program may partially realize the above-described function. Furthermore, the program may be a so-called difference file (difference program) that realizes the above-described function in combination with another program previously stored in the storage 350.

The program is executed by the processor 310 to include an operation amount acquisition unit 311, a measurement value acquisition unit 312, an acceleration correction unit 313, a target vehicle speed determination unit 314, a deceleration correction unit 315, a target horsepower determination unit 316, a target engine speed determination unit 317, an engine control unit 318, a transmission control unit 319, and a pump control unit 320.

The operation amount acquisition unit 311 acquires a signal based on the operations of the accelerator pedal 152, the inching pedal 154, the front/rear selection switch 156, the shift switch 157, the boom lever 158, and the bucket lever 159.

Hereinafter, an operation amount of the accelerator pedal 152 is also referred to as an accelerator operation amount. In addition, the operation amount of the inching pedal 154 is also referred to as an inching operation amount. In addition, a switching position of the front/rear selection switch 156 is also referred to as a direction operation amount. In addition, the switching position of the shift switch 157 is also referred to as a shift operation amount. In addition, the operation amounts of the boom lever 158 and the bucket lever 159 are also collectively referred to as a work equipment operation amount.

The measurement value acquisition unit 312 acquires a measurement value of the vehicle speed from the vehicle speed meter 232.

The acceleration correction unit 313 corrects the accelerator operation amount, based on the inching operation amount. Hereinafter, the accelerator operation amount after correction is also referred to as a corrected accelerator operation amount. The corrected accelerator operation amount decreases as the inching operation amount increases.

The target vehicle speed determination unit 314 determines a target vehicle speed, based on the measurement values of the corrected accelerator operation amount, the direction operation amount, and the vehicle speed.

The deceleration correction unit 315 corrects the target vehicle speed determined by the target vehicle speed determination unit 314, based on the inching operation amount. Hereinafter, the target vehicle speed after correction is also referred to as a corrected target vehicle speed. The corrected target vehicle speed becomes closer to zero as the inching operation amount increases. That is, an absolute value of the corrected target vehicle speed decreases as the inching operation amount increases.

The target horsepower determination unit 316 determines a target input horsepower to the HST 231 to obtain traveling performance corresponding to the accelerator operation amount, based on the measurement values of the corrected accelerator operation amount, the corrected target vehicle speed, the shift operation amount, and the vehicle speed.

The target engine speed determination unit 317 determines a target engine speed, based on the target input horsepower, the work equipment operation amount, the corrected target vehicle speed, and the accelerator operation amount. Specifically, as the target engine speed, the target engine speed determination unit 317 determines the highest engine speed out of the engine speed required for realizing the target input horsepower, the engine speed required for realizing the work equipment operation corresponding to the work equipment operation amount, the minimum engine speed required for traveling at the corrected target vehicle speed, and the engine speed corresponding to the accelerator operation amount.

The engine control unit 318 outputs a control command to the fuel injection device 211 so as to drive the engine 210 at the target engine speed determined by the target engine speed determination unit 317.

The transmission control unit 319 outputs a control command to the transmission 230 so as to have the work vehicle 100 to travel at the corrected target vehicle speed, based on the corrected target vehicle speed and the target engine speed.

The pump control unit 320 outputs a control command of the variable capacity pump 260 so that the operation of the work equipment 120 corresponding to the work equipment operation amount can be performed, based on the work equipment operation amount. In another embodiment, the variable capacity pump 260 may be controlled by the hydraulic pressure power. In this case, the control device 300 may not include the pump control unit 320.

((Control Method for Work Vehicle))

Figure 5:
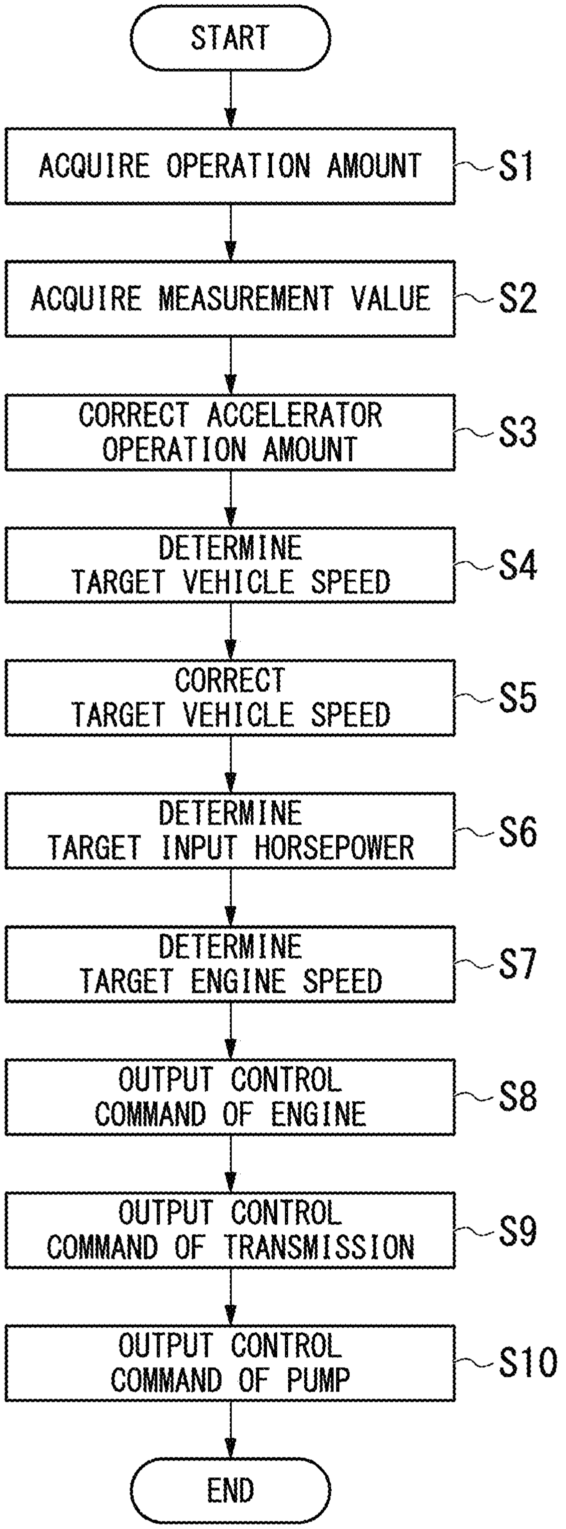
FIG. 5 is a flowchart showing a control method for the work vehicle according to the first embodiment.

FIG. 5 is a flowchart showing a control method for the work vehicle according to the first embodiment. In the following description, control when a traveling direction of the work vehicle 100 is a forward direction (direction operation amount is F) will be described. The same control may be performed when the traveling direction of the work vehicle 100 is a rearward direction (direction operation amount is R).

First, the operation amount acquisition unit 311 acquires the operation amount from each of the accelerator pedal 152, the brake pedal 153, the inching pedal 154, the steering wheel 155, the front/rear selection switch 156, the shift switch 157, the boom lever 158, and the bucket lever 159 (Step S1). In addition, the measurement value acquisition unit 312 acquires the measurement value of the vehicle speed from the vehicle speed meter 232 (Step S2).

((Correction of Accelerator Operation Amount))

Figure 6:
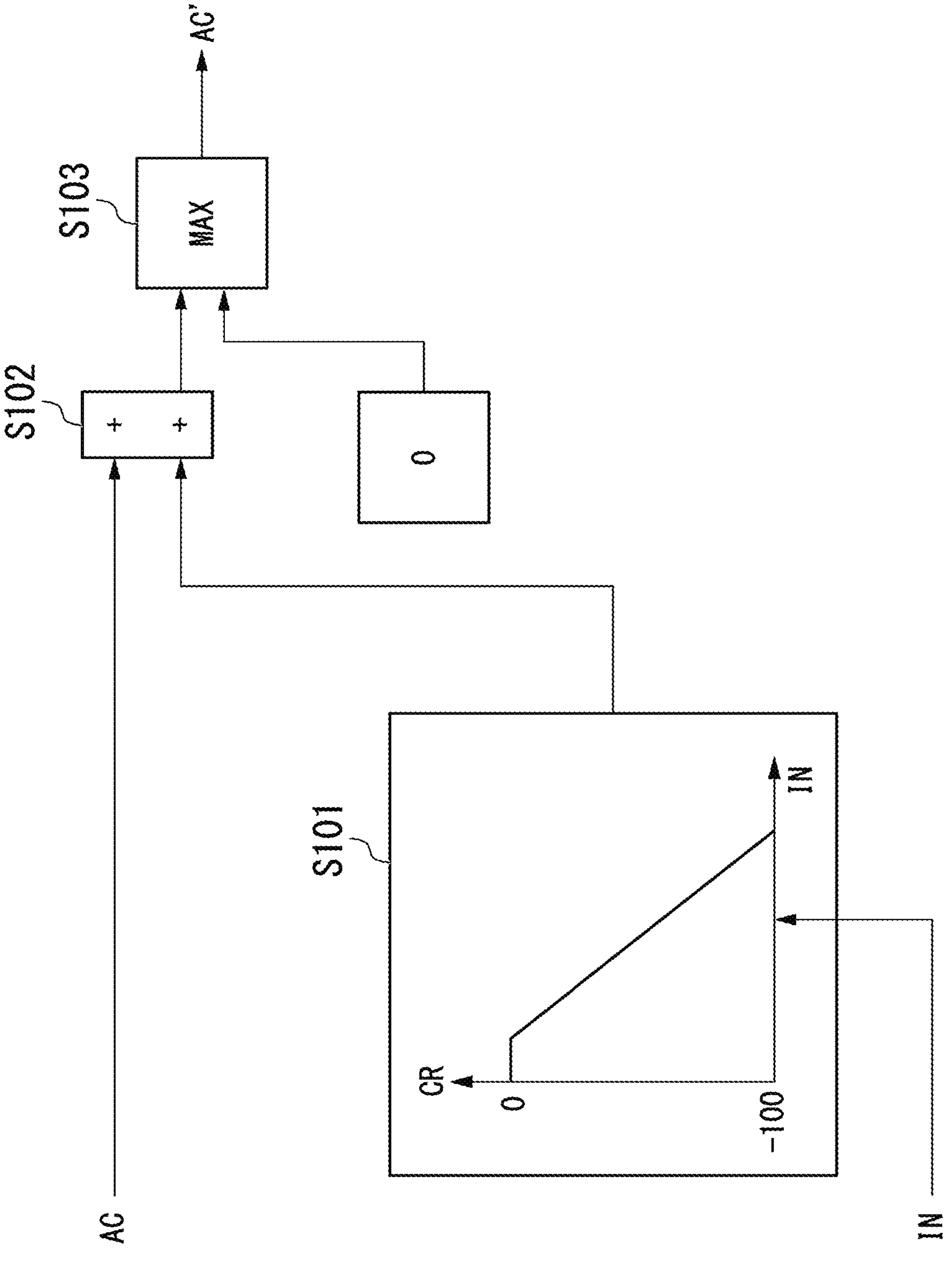
FIG. 6 is a view showing a method for correcting an accelerator operation amount according to the first embodiment.

Next, the acceleration correction unit 313 obtains a corrected accelerator operation amount AC' by correcting an accelerator operation amount AC, based on an inching operation amount IN (Step S3). Here, a specific method for correcting the accelerator operation amount AC will be described. FIG. 6 is a view showing a method for correcting the accelerator operation amount according to the first embodiment.

The acceleration correction unit 313 determines a correction amount CR of the accelerator operation amount, based on the inching operation amount IN acquired in Step S1 (Step S101). The correction amount CR of the accelerator operation amount has a value of −100% or greater and 0% or smaller. The correction amount CR of the accelerator operation amount monotonically decreases with respect to the inching operation amount IN. In the present embodiment, the term “monotonically decreasing” means that when one value increases, the other value always decreases, or is not changed (monotonically non-increasing). Similarly, the term “monotonically increasing” means that when one value increases, the other value always increases, or is not changed (monotonically non-decreasing). When the inching operation amount is 0% to equal to or smaller than a predetermined allowance operation amount, the correction amount of the accelerator operation amount is 0%.

The acceleration correction unit 313 adds the correction amount CR determined in Step S101 to the accelerator operation amount AC acquired in Step S1 (Step S102). The correction amount CR determined in Step S101 has a value of 0% or smaller. Accordingly, a value obtained by adding the correction amount CR to the accelerator operation amount AC is a value equal to or smaller than the accelerator operation amount AC. The acceleration correction unit 313 determines a greater value between the value obtained in Step S102 and 0%, as the corrected accelerator operation amount AC' (Step S103).

((Determination of Target Vehicle Speed))

Figure 7:
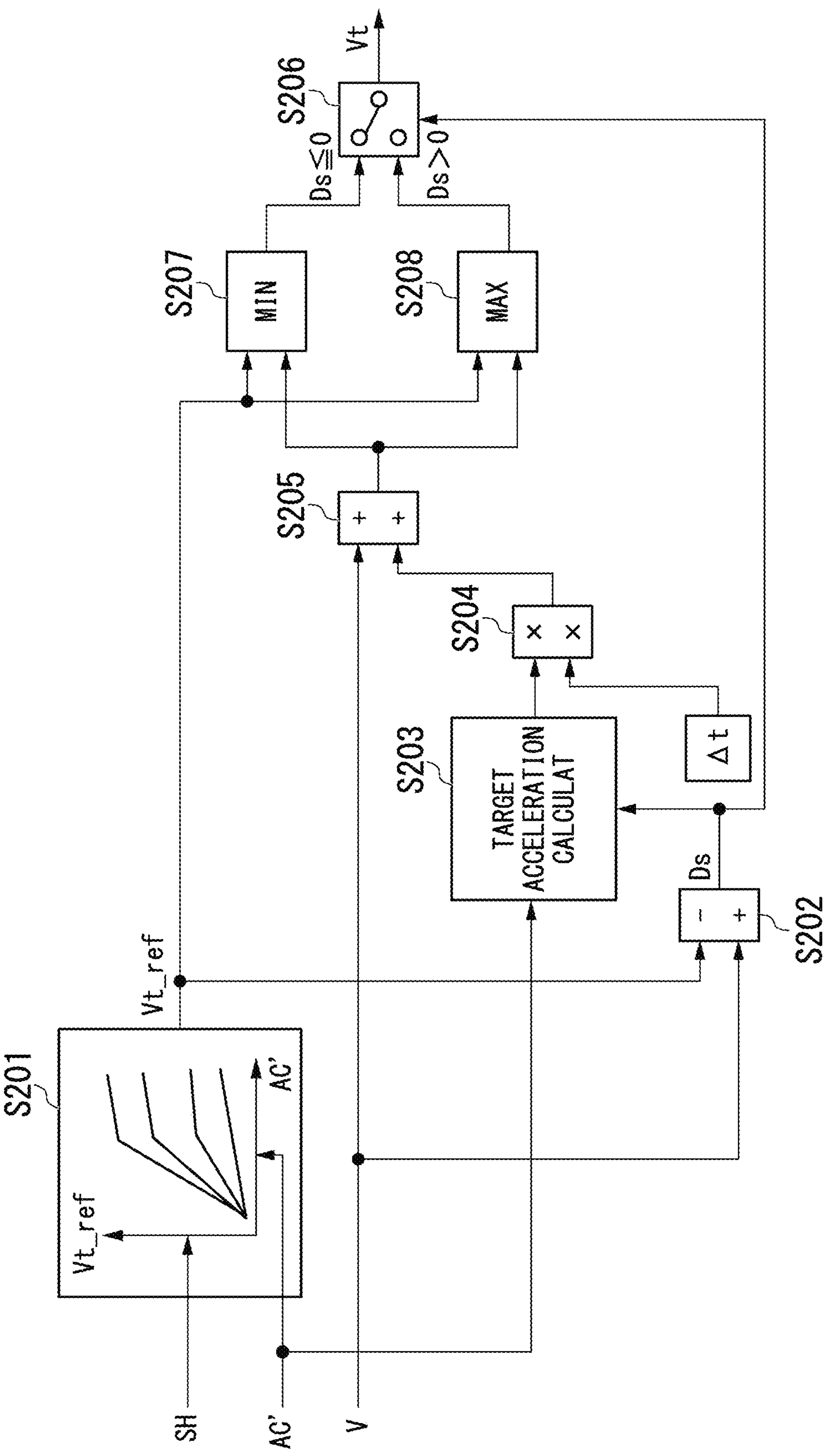
FIG. 7 is a view showing a method for determining a target vehicle speed according to the first embodiment.

Next, the target vehicle speed determination unit 314 determines a target vehicle speed Vt, based on measurement values V of the corrected accelerator operation amount AC', a shift operation amount SH, and the vehicle speed (Step S4). Here, a specific method for determining the target vehicle speed Vt will be described. FIG. 7 is a view showing a method for determining the target vehicle speed according to the first embodiment.

The target vehicle speed determination unit 314 determines a target reference vehicle speed Vt_ref from the corrected accelerator operation amount AC' obtained in Step S3 and the shift operation amount SH obtained by the operation amount acquisition unit 311 (Step S201). The target reference vehicle speed Vt_ref is a vehicle speed set as a target arrival vehicle speed when the work vehicle 100 travels on flat ground. The target reference vehicle speed Vt_ref monotonically increases with respect to the corrected accelerator operation amount. In the target vehicle speed determination unit 314, a relationship between the corrected accelerator operation amount AC' and the target reference vehicle speed Vt_ref is defined for each shift operation amount SH. Even when the corrected accelerator operation amounts AC' are the same as each other, the target reference vehicle speed Vt_ref increases as the shift operation amount SH is a value on a high-speed side.

Next, the target vehicle speed determination unit 314 calculates a vehicle speed deviation Ds by subtracting the target reference vehicle speed Vt_ref calculated in Step S201 from the measurement value V of the vehicle speed acquired in Step S2 (Step S202). When the vehicle speed deviation Ds is negative, it means that the work vehicle 100 travels during acceleration. When the vehicle speed deviation Ds is positive, it means that the work vehicle 100 travels during deceleration.

Next, the target vehicle speed determination unit 314 calculates the target acceleration, based on the vehicle speed deviation Ds calculated in Step S202 and the corrected accelerator operation amount AC' obtained in Step S3 (Step S203). The target acceleration monotonically decreases with respect to the vehicle speed deviation Ds, and monotonically increases with respect to the corrected accelerator operation amount AC'. Next, the target vehicle speed determination unit 314 calculates a target speed change amount by multiplying the target acceleration calculated in Step S203 by a time Δt relating to a control cycle of the control device 300 (Step S204).

The target vehicle speed determination unit 314 adds the target speed change amount calculated in Step S204 to the measurement value V of the vehicle speed acquired in Step S2 (Step S205). The target vehicle speed determination unit 314 determines whether or not the vehicle speed deviation Ds calculated in Step S202 is greater than 0 (Step S206). When the vehicle speed deviation Ds is 0 or smaller, that is, when the work vehicle 100 is accelerating, the target vehicle speed determination unit 314 determines the lowest speed between the target reference vehicle speed Vt_ref calculated in Step S201 and the speed calculated in Step S205, as the target vehicle speed Vt (Step S207). On the other hand, when the vehicle speed deviation Ds is greater than 0, that is, when the work vehicle 100 is decelerating, the target vehicle speed determination unit 314 determines the highest speed between the target reference vehicle speed Vt_ref calculated in Step S201 and the speed calculated in Step S205, as the target vehicle speed Vt (Step S208). When the target vehicle speed Vt is negative, the target vehicle speed determination unit 314 sets the target vehicle speed Vt to 0.

((Correction of Target Vehicle Speed))

Figure 8:
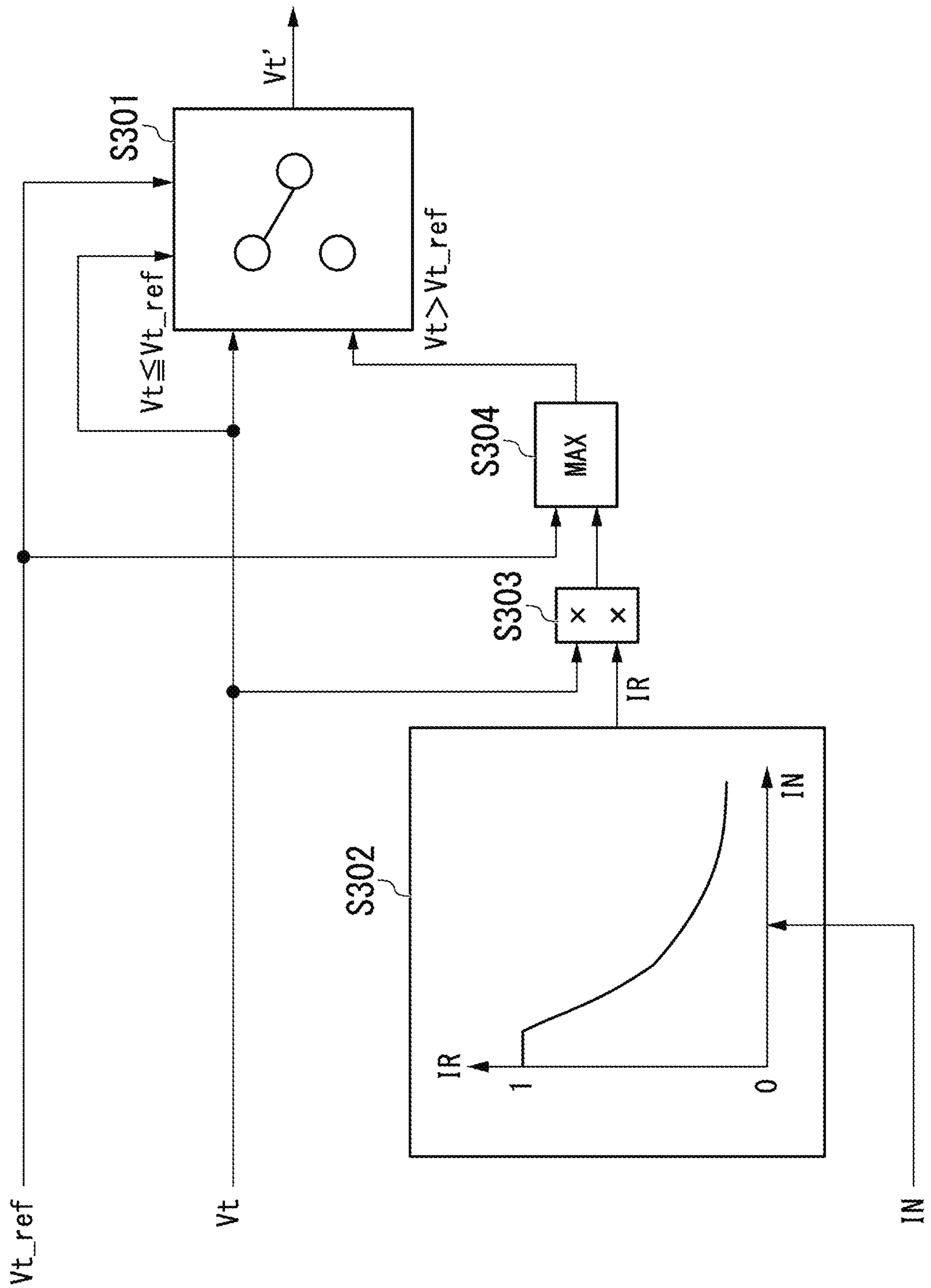
FIG. 8 is a view showing a method for correcting the target vehicle speed according to the first embodiment.

Next, the deceleration correction unit 315 obtains a corrected target vehicle speed Vt' by correcting the target vehicle speed Vt determined in Step S4 based on the inching operation amount IN (Step S5). Here, a specific method for determining the corrected target vehicle speed Vt' will be described. FIG. 8 is a view showing a method for correcting the target vehicle speed according to the first embodiment.

The deceleration correction unit 315 determines whether or not the target vehicle speed Vt calculated in Step S4 is higher than the target reference vehicle speed Vt_ref (Step S301). When the target vehicle speed Vt is equal to or lower than the target reference vehicle speed Vt_ref, the deceleration correction unit 315 does not correct the target vehicle speed Vt. For convenience, even when the target vehicle speed is not corrected, the target vehicle speed output by the deceleration correction unit 315 is referred to as the corrected target vehicle speed Vt'.

On the other hand, when the target vehicle speed Vt is higher than the target reference vehicle speed Vt_ref, the deceleration correction unit 315 determines an inching ratio IR, based on the inching operation amount IN acquired in Step S1 (Step S302). The inching ratio IR has a value of higher than 0 and 1 or smaller. The inching ratio IR monotonically decreases with respect to the inching operation amount IN. When the inching operation amount is 0% to equal to or smaller than a predetermined allowance operation amount, the inching ratio IR is 1. The deceleration correction unit 315 multiplies the target vehicle speed Vt calculated in Step S4 by the inching ratio IR determined in Step S302 (Step S303). The deceleration correction unit 315 determines the highest speed between the target reference vehicle speed Vt_ref calculated in Step S4 and the speed calculated in Step S303, as the corrected target vehicle speed Vt' (Step S304).

((Determination of Target Input Horsepower))

Figure 9:
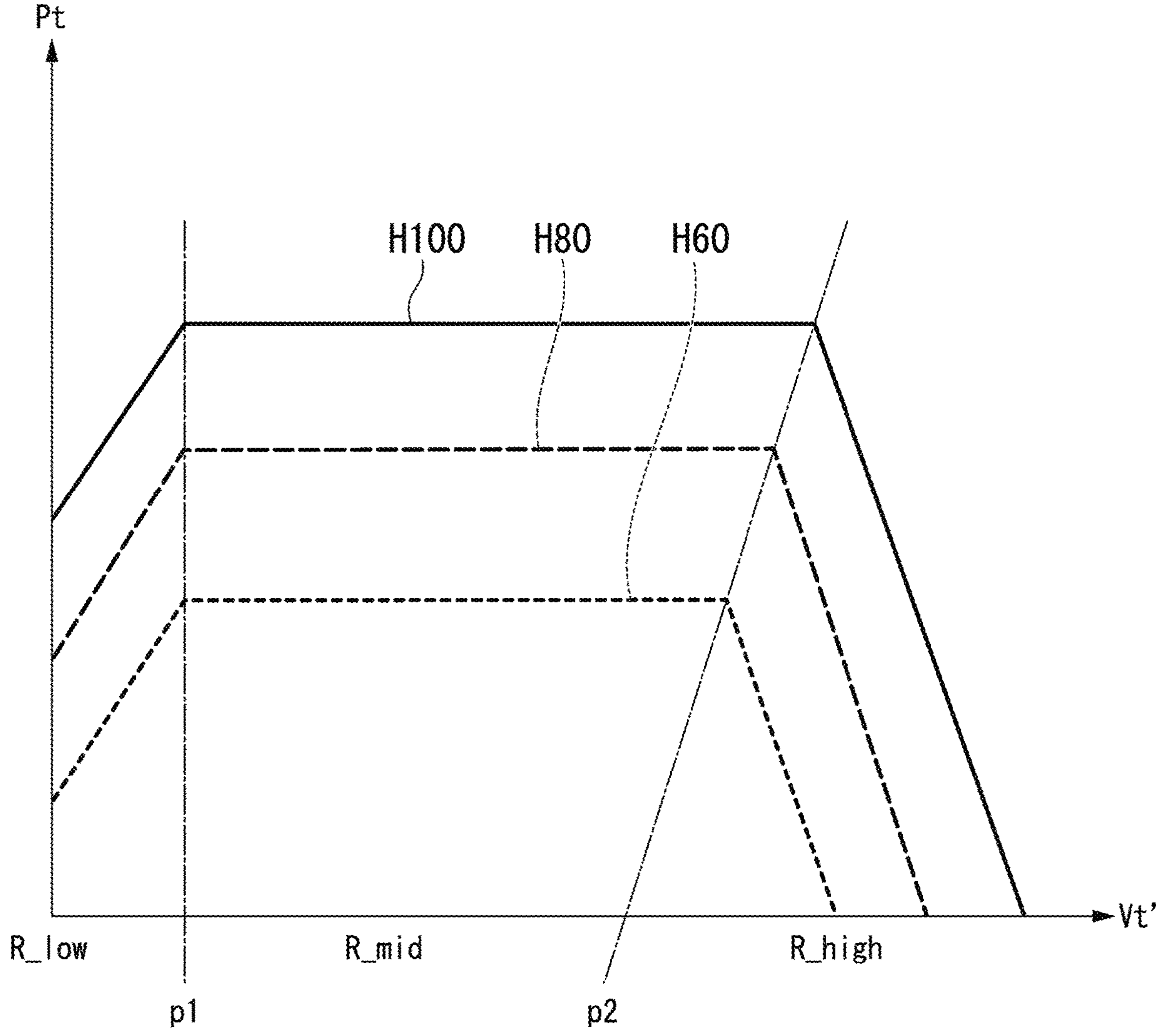
FIG. 9 is a view showing a vehicle speed-horsepower characteristic indicating a relationship between a vehicle speed and a target input horsepower of the work vehicle according to the first embodiment.

Next, the target horsepower determination unit 316 determines the target input horsepower Pt to the HST 231, based on the corrected accelerator operation amount AC' and the corrected target vehicle speed Vt' (Step S6). FIG. 9 is a view showing a vehicle speed-horsepower characteristic indicating a relationship between the corrected target vehicle speed and the target input horsepower of the work vehicle according to the first embodiment. FIG. 9 shows an example of the vehicle speed-horsepower characteristic H100 when the corrected accelerator operation amount AC' is 100%, the vehicle speed-horsepower characteristic H80 when the corrected accelerator operation amount AC' is 80%, and the vehicle speed-horsepower characteristic H60 when the corrected accelerator operation amount AC' is 60%.

As shown in FIG. 9, the vehicle speed-horsepower characteristic has two inflection points p1 and p2 regardless of the corrected accelerator operation amount AC'. In a low-speed region R_low where the corrected target vehicle speed is zero or higher and lower than the inflection point p1, the target input horsepower Pt monotonically increases with respect to the corrected target vehicle speed Vt'. In a medium-speed region R_mid where the corrected target vehicle speed is equal to or higher than the inflection point p1 and lower than the inflection point p2, the target input horsepower Pt is constant regardless of the corrected target vehicle speed Vt'. In a high-speed region R_high where the vehicle speed is the inflection point p2 or higher, the target input horsepower Pt monotonically decreases with respect to the corrected target vehicle speed Vt'.

The target horsepower determination unit 316 determines the target input horsepower Pt from the corrected target vehicle speed Vt', based on the vehicle speed-horsepower characteristic specified from the corrected accelerator operation amount AC'.

((Determination of Target Engine Speed))

Figure 10:
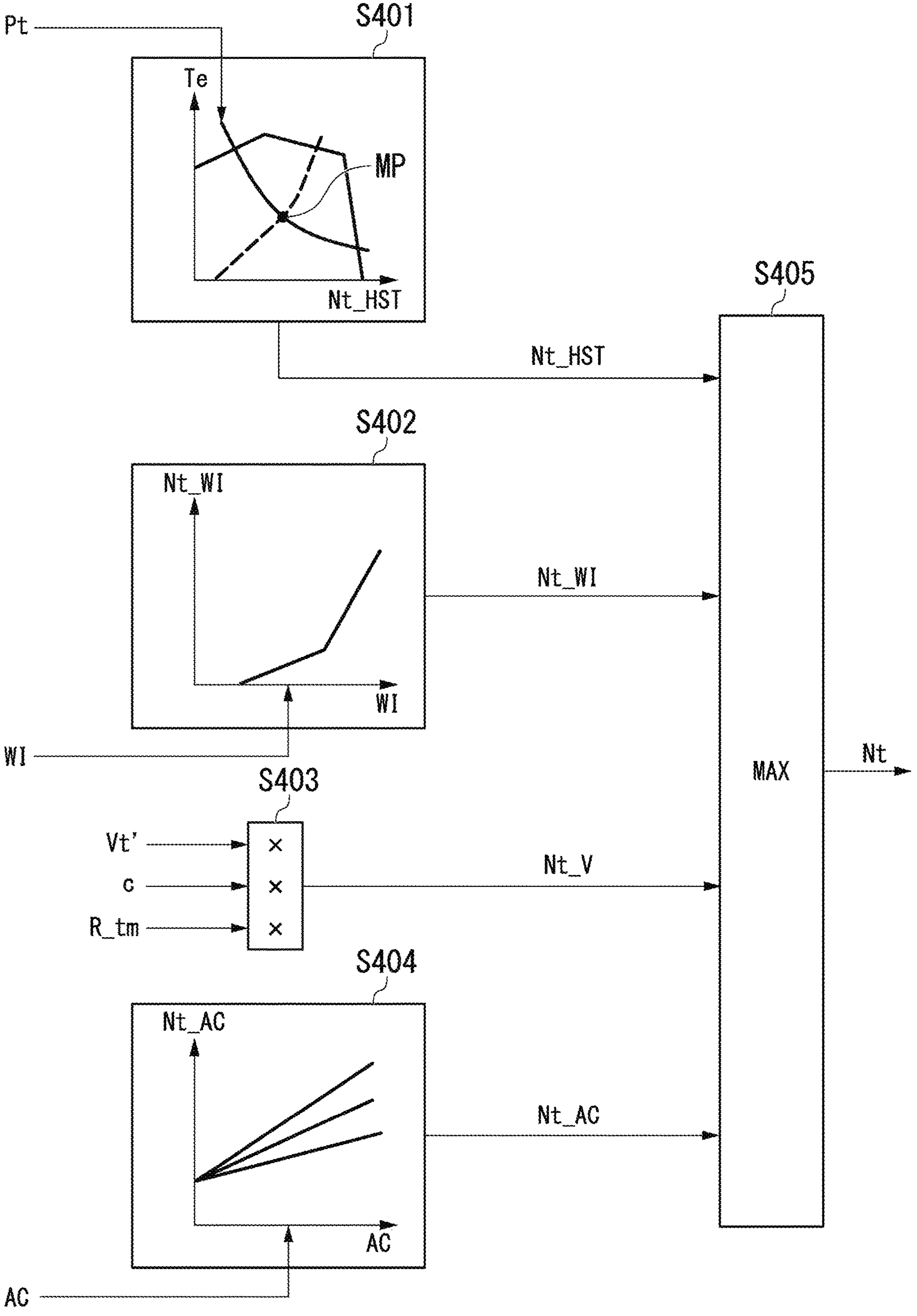
FIG. 10 is a view showing a method for determining a target engine speed according to the first embodiment.

Next, the target engine speed determination unit 317 determines a target engine speed Nt, based on the accelerator operation amount AC and the work equipment operation amount WI which are acquired in Step S1, the corrected target vehicle speed Vt' determined in Step S5, and the target input horsepower Pt determined in Step S6 (Step S7). Here, a specific method for determining the target engine speed Nt will be described. FIG. 10 is a view showing a method for determining the target engine speed according to the first embodiment.

The target engine speed determination unit 317 determines an engine speed Nt_HST required for realizing the target input horsepower Pt from the target input horsepower Pt determined in Step S6 (Step S401). The target engine speed determination unit 317 determines the engine speed Nt_HST required for realizing the target input horsepower Pt so as to match a torque of the engine 210 and an absorption torque of the HST 231 with each other at a predetermined matching point MP on an equivalent horsepower line corresponding to the target input horsepower Pt. In the present embodiment, in order to facilitate the description, the absorption torque of the HST 231 will be described without considering the shift in the PTO 220.

The target engine speed determination unit 317 determines an engine speed Nt_WI required for realizing the operation of the work equipment 120 corresponding to the work equipment operation amount WI from the work equipment operation amount WI acquired in Step S1 (Step S402). The engine speed Nt_WI monotonically increases with respect to the work equipment operation amount WI.

The target engine speed determination unit 317 determines a minimum engine speed Nt_V required for traveling at the corrected target vehicle speed, based on the corrected target vehicle speed Vt' determined in Step S5 (Step S403). The target engine speed determination unit 317 determines a value obtained by multiplying the corrected target vehicle speed Vt' by a predetermined conversion coefficient c and a minimum transmission gear ratio R_tm, as the target engine rotation speed for the vehicle speed. The conversion coefficient c is a coefficient for converting the corrected target vehicle speed Vt' to the rotation speed of the output shaft of the transmission 230. The conversion coefficient c may take into consideration the shift in the PTO 220. The minimum transmission gear ratio R_tm is a minimum gear ratio of the transmission 230. The minimum transmission gear ratio R_tm corresponds to a ratio of the input rotation speed/the output rotation speed when shifted to the maximum high-speed side within a predetermined shift range of the transmission 230.

The target engine speed determination unit 317 determines an engine speed Nt_AC that monotonically increases with respect to the accelerator operation amount AC, based on the accelerator operation amount AC acquired in Step S1 (Step S404).

As the target engine rotation speed Nt, the target engine speed determination unit 317 determines the highest engine speed out of the engine speed Nt_HST determined in Step S401, the engine speed Nt_WI determined in Step S402, the engine speed Nt_V determined in Step S403, and the engine speed Nt_AC determined in Step S404 (Step S405).

The engine control unit 318 outputs a control command to the fuel injection device 211 so as to drive the engine 210 at the target engine speed Nt determined in Step S7 (Step S8). In addition, the transmission control unit 319 outputs a control command to the transmission 230 so as to have the work vehicle 100 to travel at the corrected target vehicle speed Vt', based on the corrected target vehicle speed Vt' determined in Step S5 and the target engine speed Nt determined in Step S7 (Step S9). The pump control unit 320 outputs a control command of the variable capacity pump 260, based on the work equipment operation amount WI acquired in Step S1 (Step S10).

OPERATIONAL EFFECT

In this way, according to the first embodiment, the control device 300 corrects the accelerator operation amount, based on the inching operation amount, and determines the target vehicle speed, based on the corrected accelerator operation amount and the shift operation amount. In this manner, when the operator operates the accelerator pedal 152 and operates the inching pedal 154 as in the operation of the work vehicle having the torque converter type transmission, the control device 300 can realize suppressed acceleration by operating the inching pedal 154. Therefore, the control device 300 can reduce a sense of unease in operating the work vehicle 100 for the operator accustomed to the torque converter type transmission.

In addition, according to the first embodiment, the control device 300 further corrects the target vehicle speed, based on the inching operation amount. When the inching pedal 154 is operated, there is a high possibility that the operator may intend to actively decelerate the work vehicle 100. Therefore, the control device 300 corrects the target vehicle speed, based on the inching operation amount. In this manner, the control device 300 can realize a stronger braking force, compared to a case where the accelerator pedal 152 is simply released. Another embodiment is not limited thereto, and the control device 300 may not correct the target vehicle speed.

In addition, according to the first embodiment, the control device 300 determines the target engine speed, based on the accelerator operation amount having no correction and the work equipment operation amount. As the inching operation amount increases, the corrected accelerator operation amount and the corrected target vehicle speed become closer to zero. That is, as the inching operation amount increases, the absolute value of the corrected accelerator operation amount and the absolute value of the corrected target vehicle speed become smaller values. Therefore, when the target engine speed is determined, based on the corrected accelerator operation amount or the corrected target vehicle speed, there is a possibility that the operator may have a sense of unease since the rotation speed of the engine 210 is low in pressing the accelerator pedal 152. In contrast, according to the first embodiment, the control device 300 determines the target engine speed, based on the accelerator operation amount having no correction. In this manner, it is possible to realize the rotation of the engine 210 in response to a pressing operation of the accelerator pedal 152. Therefore, it is possible to reduce a sense of unease in operating the accelerator pedal 152. The control device 300 according to another embodiment may determine the target engine speed without using the accelerator operation amount having no correction.

Hitherto, the embodiment has been described in detail with reference to the drawings. However, the specific configuration is not limited to the above-described embodiment, and various design changes can be made.

In addition, the work vehicle 100 according to the above-described embodiment is a wheel loader. However, the configuration is not limited thereto. For example, the work vehicle 100 according to another embodiment may be another work vehicle such as a dump truck, a motor grader, or a bulldozer.

In addition, in another embodiment, a procedure of the above-described processes may be changed as appropriate. In addition, some processes may be performed in parallel.

According to the above-described disclosure of the present invention, a control device for a work vehicle can realize suppressed acceleration by operating an inching pedal in the work vehicle that controls engine drive, based on an operation amount of a work equipment operation lever and an accelerator pedal.

What is claimed is:

1. A control device for a work vehicle that includes an engine, an accelerator, a work equipment operation device, an inching operation device, and a shift operation device, the control device being configured to control an engine output of the engine based on an accelerator operation amount of the accelerator and a work equipment operation amount of the work equipment operation device, the control device comprising:

an accelerator operation amount correction unit that obtains a corrected accelerator operation amount by correcting the accelerator operation amount based on an inching operation amount of the inching operation device;

a target vehicle speed determination unit that determines a target vehicle speed based on the corrected accelerator operation amount and a signal based on an operation of the shift operation device;

a deceleration correction unit that obtains a corrected target vehicle speed by correcting the target vehicle speed based on the inching operation amount; and an engine control unit that outputs a control command to a fuel injection device of the engine based on the corrected accelerator operation amount and the corrected target vehicle speed.

2. The control device for a work vehicle according to claim 1, further comprising:

a target engine speed determination unit that determines a target engine speed based on
the accelerator operation amount and
the work equipment operation amount.

3. A work vehicle including the control device according to claim 1, the work vehicle further comprising:

a transmission that shifts an output of the engine;

a work equipment pump driven by the engine; and work equipment driven by hydraulic oil discharged from the work equipment pump.

4. A control method for a work vehicle that includes an engine, an accelerator, a work equipment operation device, an inching operation device, and a shift operation device, the control method controlling an engine output of an engine based on an accelerator operation amount of the accelerator and a work equipment operation amount of the work equipment operation device, the control method comprising:

obtaining a corrected accelerator operation amount by correcting the accelerator operation amount based on an inching operation amount of the inching operation device;

determining a target vehicle speed based on
the corrected accelerator operation amount and
a signal based on an operation of the shift operation device;

obtaining a corrected target vehicle speed by correcting the target vehicle speed based on the inching operation amount; and outputting a control command to a fuel injection device of the engine based on the corrected accelerator operation amount and the corrected target vehicle speed.

* * * * *